3,171,745
CHLORPROMAZINE CONTAINING FEED
Mervyn J. Lobel, 1 E. 72nd St., New York, N.Y.
No Drawing. Filed Jan. 28, 1963, Ser. No. 254,473
8 Claims. (Cl. 99—4)

This application is a continuation-in-part of my co-pending applications Serial No. 744,023, filed June 23, 1958, and Serial No. 743,016, filed June 19, 1958, and now both abandoned.

The present invention relates to feed additive compositions for grazing animals, such as cattle, sheep, and goats and other ruminants and poultry and other domesticated fowl such as chickens, ducks, geese, turkeys and the like.

It is among the objects of the present invention to provide novel feed additive compositions which, when added in relatively small proportions to feeds for various animals including ruminants such as cattle, sheep, and goats and poultry and other domesticated fowl such as chickens, ducks, geese, turkeys and the like will result in greatly improved growth of such animals in much shorter time, with greatly lessened feeding periods being required before marketing and with production of better meat quality and higher marketable value.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

It has surprisingly been found that the addition of relatively minute amounts of chlorpromazine, when added to animal feeds, will accelerate the growth of such animals and their general well being, and will reduce the time for growth before they are marketable.

Although chlorpromazine has been sometimes used as a tranquilizer in relatively large dosages, it has been found that when used in relatively minute amounts in feeds in which amounts it has not tranquilizing effect, it is surprisingly effective in enhancing the growth factor.

When used in large quantities in the amount that would be required to be effective as a tranquilizer, the accelerated growth is not observed and actually there is a contrary effect, as the poultry and grazing animals will lose weight rather than gain weight.

The effective range is about 0.001 to 0.5 part by weight per 50,000 parts of feed with an optimum range of 0.003 to 0.25 part in weight.

This is about 1/100 to 1/1000 of the normal dosage of chlorpromazine as would be used in connection with tranquilizing purposes.

However, chlorpromazine is not too effective in enhancing the growth factor when combined with feeds by itself.

Chlorpromazine is most effective when combined in compositions including vitamin A and guaiacol, with the vitamin and guaiacol being used in about equal proportions and in the proportion of about 10 to 50 times the amount of chlorpromazine.

In addition to the above ingredients, it is also possible to include camphor and iodine or sodium or potassium iodide in about the same amounts as guaiacol.

The additional ingredients appear to enhance the growth factor.

Oil of eucalyptus may also be included in similar amounts.

For example it is possible to combine together about 20 to 300 parts of vitamin A, about 3 to 50 parts of iodine, 33 to 200 parts of camphor, 33 to 200 parts of oil of eucalyptus, 33 to 200 parts of guaiacol, and 0.3 to 25 parts of chlorpromazine.

All of the above parts are in parts by weight.

Although this composition may be utilized in drinking water for grazing animals, it is most effectively combined with the indoor fodders and particularly it is combined in finely divided powdered form with such fodders during kiln or other types of drying.

For poultry and other domesticated fowl, the composition may be used as a surface coating upon poultry feed pellets. The composition may also be included within the pellets of the feed, as well as surfaced in finely divided form upon the outside of the feed pellets.

Furthermore, the mesh division of the chlorpromazine composition should range in the order of about 100 to 1000 mesh, as contrasted to the food particles or pellets, which may range from 4 to 10 mesh.

To assure uniform distribution, the powdered chlorpromazine compositions is desirably incorporated with the arid and divided feed or pelleted feed in rolling and mixing processes so that the additive will be distributed in finely divided discrete flakes or particles over the surfaces of the food particles.

It may also be desirable to utilize adhesive which will assure adherence of the chlorpromazine composition to the particles, which adhesives can be gum emulsions such as gum acacia or gum tragacanth, or even vegetable or fish oil used as a vitamin A carrier.

As an example of a satisfactory composition:

| Ingredient | Parts by weight | Range |
|---|---|---|
| Vitamin A | 1.112 | 0.2224 to 2.78. |
| Iodine A | 0.166 | 0.033 to 0.5. |
| Camphor | 1.33 | 0.333 to 2. |
| Oil of eucalyptus | 1.33 | 0.333 to 2. |
| Guaiacol | 1.33 | 0.333 to 2. |
| Chlorpromazine | 0.17 | 0.033 to 25. |
| Corn meal | 480 | |

The amount of corn meal may be widely varied for example in feeds for poultry since it merely serves as a carrier and it may be replaced by other inert or edible carriers such as charcoal, chalk, or even liquids such as glycerin or water in which the composition can be dissolved or dispersed or emulsified.

To make up the above combination the iodine is triturated with the camphor and then the oils and vitamin A are slowly added and an emulsion of water and gum acacia is added.

The chlorpromazine composition may be incorporated with the protective film forming materials to protect it against atmospheric influences, as by including paraffin or other protective waxy materials which are inert to the ingredients of the chlorpromazine composition.

The finished mixture may be added to the corn meal, or other finely divided cereals or carriers may be mixed in with the above composition in amounts ranging from equal to 10 to 50 times the quantity of the above compositions.

Small amounts of vitamin E or hydroquinone may also be included in amounts ranging from 10,000 to 100,000 units, and vitamin B may also be included in a range of 5,000 to 20,000 units.

The essential combination of vitamin A, guaiacol and chlorpromazine is combined with the divided feed, and less preferably with liquid compositions for grazing animals. It is most effective with cattle, either beef animals or cows, sheep, goats and other ruminants. The same essential combination of vitamin A, guaiacol and chlorpromazine combined with the pellets is most effective with domesicated chickens, ducks, geese, and turkeys.

It is also of value in feed compositions used for pigs.

The chlorpromazine composition apparently improves the ability of the animals to absorb and retain the ingredients of the feed composition and there is better anabolic effect, there is much less wastage and much greater use of the feed, resulting in a gerater growth per pound of flesh per unit feed administered.

The grazing animals which receive feeds containing th additive have a shorter growth period preparatory to marketing and they achieve their marketable weight in a shorter feeding period and with greatly improved meat quality.

Although pellets or solid granular feeds as described above are preferred, powdered or liquid feeds containing the additive may also less preferably be utilized. In some instances, particularly for poultry and other domesticated fowl, equal quantities of promazine may be substituted for chlorpromazine.

The grazing animals and poultry which have been fed with the above additive have better bone structure, and the flesh thereof is sweeter and better flavored.

In the case of poultry comparative experiments show that where control poultry without the additive is compared in growth with poultry which is given the additive in a range of 0.05 to 2.0 ounces per hundred pounds of feed, the growth period preparatory to marketing may be shortened by 10%, and in many instances up to 20%, with the poultry achieving the same weight as the result of this shorter feeding period and with greatly improved meat quality, and with the general characteristics of the flock being greatly improved from a marketable value.

As many changes could be made in the above grazing animal and poulary and dometsic fowl feeding system, and many widely different embodiments of this invention could be made without departing from the scope of the claims, it is intended that all matter contained in the above description shall be interpreted as illustrative and not in a limiting sense.

What is claimed is:

1. An animal food additive comprising minute amounts of chlorpromazine in the ratio of 0.001 to 0.5 part by weight per 50,000 parts of animal feed, vitamin A about 10 to 50 times the amount of the chlorpromazine, and guaiacol about 10 to 50 times the amount of the chlorpromazine.

2. An animal food additive comprising minute amounts of chlorpromazine in the ratio of 0.001 to 0.5 part by weight per 50,000 parts of animal feed, vitamin A about 10 to 50 times the amount of the chlorpromazine, and guaiacol about 10 to 50 times the amount of the chlorpromazine, and camphor about 10 to 50 times the amount of the chlorpromazine.

3. An animal food additive comprising minute amounts of chlorpromazine in the ratio of 0.001 to 0.5 part by weight per 50,000 parts of animal feed, vitamin A about 10 to 50 times the amount of the chlorpromazine, and guaiacol about 10 to 50 times the amount of the chlorpromazine, and camphor about 10 to 50 times the amount of the chlorpromazine, and eucalyptol about 10 to 50 times the amount of the chlorpromazine.

4. An animal food additive comprising minute amounts of chlorpromazine in the ratio of 0.001 to 0.5 part by weight per 50,000 parts of animal feed, vitamin A about 10 to 50 times the amount of the chlorpromazine, and guaiacol about 10 to 50 times the amount of the chlorpromazine, and camphor about 10 to 50 times the amount of the chlorpromazine, and eucalyptol about 10 to 50 times the amount of the chlorpromazine, and iodine about 1 to 10 times the amount of the chlorpromazine.

5. A poultry food additive comprising minute amounts of chlorpromazine in the ratio of 0.001 to 0.5 part by weight per 50,000 parts of poultry feed, vitamin A about 10 to 50 times the amount of the chlorpromazine, and guaiacol about 10 to 50 times the amount of the chlorpromazine.

6. A poultry food additive comprising minute amounts of chlorpromazine in the ratio of 0.001 to 0.5 part by weight per 50,000 parts of poultry feed, vitamin A about 10 to 50 times the amount of the chlorpromazine, and guaiacol about 10 to 50 times the amount of the chlorpromazine, and camphor about 10 to 50 times the amount of the chlorpromazine.

7. A poultry food additive comprising minute amounts of chlorpromazine in the ratio of 0.001 to 0.5 part by weight per 50,000 parts of poultry feed, vitamin A about 10 to 50 times the amount of the chlorpromazine, and guaiacol about 10 to 50 times the amount of the chlorpromazine, and camphor about 10 to 50 times the amount of the chlorpromazine, and eucalyptol about 10 to 50 times the amount of the chlorpromazine.

8. A poultry food additive comprising minute amounts of chlorpromazine in the ratio of 0.001 to 0.5 part by weight per 50,000 parts of poultry feed, vitamin A about 10 to 50 times the amount of the chlorpromazine, and guaiacol about 10 to 50 times the amount of the chlorpromazine, and camphor about 10 to 50 times the amount of the chlorpromazine, and eucalyptol about 10 to 50 times the amount of the chlorpromazine, and iodine about 1 to 10 times the amount of the chlorpromazine.

References Cited by the Examiner

UNITED STATES PATENTS 2,871,122  1/59  Ott.

OTHER REFERENCES

Dupont: Agr. News Letter, Summer, 1957, pp. 3 and 4.
Jr. of Animal Science 16, November 1957, p. 1020.
Lancet 11, October 19, 1957, pp. 804–5.

A. LOUIS MONACELL, *Primary Examiner.*